US009482900B2

(12) United States Patent
Yun et al.

(10) Patent No.: US 9,482,900 B2
(45) Date of Patent: Nov. 1, 2016

(54) DISPLAY DEVICE

(71) Applicant: LG Display Co., Ltd., Seoul (KR)

(72) Inventors: Kyung Sun Yun, Busan (KR); Seoung Jin Park, Paju-si (KR); Moo Hyoung Song, Daegu-si (KR); Chang Soo Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 24 days.

(21) Appl. No.: 14/141,805

(22) Filed: Dec. 27, 2013

(65) Prior Publication Data

US 2014/0347600 A1 Nov. 27, 2014

(30) Foreign Application Priority Data

May 27, 2013 (KR) .................. 10-2013-0059764

(51) Int. Cl.
*G02F 1/1335* (2006.01)
*F21V 7/04* (2006.01)
*F21V 8/00* (2006.01)

(52) U.S. Cl.
CPC ....... *G02F 1/133615* (2013.01); *G02B 6/0055* (2013.01); *G02B 6/0016* (2013.01); *G02B 6/0053* (2013.01); *G02B 6/0076* (2013.01)

(58) Field of Classification Search
USPC ................................. 362/623–624
See application file for complete search history.

(56) References Cited

U.S. PATENT DOCUMENTS

| 5,961,198 | A | * | 10/1999 | Hira | ..................... | G02B 6/0036 349/65 |
| 6,603,519 | B2 | | 8/2003 | Fukiharu | | |
| 2004/0109105 | A1 | | 6/2004 | Nagabuko et al. | | |
| 2006/0061537 | A1 | | 3/2006 | Yu et al. | | |
| 2006/0268571 | A1 | | 11/2006 | Harada et al. | | |
| 2007/0153174 | A1 | * | 7/2007 | Kim | ..................... | G02F 1/136227 349/114 |
| 2007/0279551 | A1 | * | 12/2007 | Umebayashi | ................... | 349/65 |
| 2008/0049168 | A1 | | 2/2008 | Kubota | | |
| 2008/0055925 | A1 | | 3/2008 | Masamoto et al. | | |
| 2010/0246163 | A1 | | 9/2010 | Chen et al. | | |
| 2010/0296314 | A1 | * | 11/2010 | Segawa | ......................... | 362/616 |
| 2012/0081395 | A1 | | 4/2012 | Adi et al. | | |

(Continued)

FOREIGN PATENT DOCUMENTS

| CN | 1504807 A | 6/2004 |
| CN | 1570679 A | 1/2005 |

(Continued)

OTHER PUBLICATIONS

Office Action for Taiwanese Patent Application No. 102147038, Jun. 16, 2015, 10 Pages.

(Continued)

*Primary Examiner* — Wen-Ying P Chen
(74) *Attorney, Agent, or Firm* — Fenwick & West LLP (57) ABSTRACT

Disclosed is a display device with slimness and narrowness, wherein the display device may include a liquid crystal panel; a light source for providing light to the liquid crystal panel; a light guide formed of a glass material, wherein the light source is combined with one side of the light guide; a reflector formed on at least one of one and the other surfaces of the light guide, wherein the reflector includes an organic material and a metal compound; and an adhesive member formed on the one surface of the light guide confronting the liquid crystal panel, and configured to attach the liquid crystal panel and the light guide to each other.

12 Claims, 11 Drawing Sheets

(56) References Cited

U.S. PATENT DOCUMENTS

| | | |
|---|---|---|
| 2012/0106197 A1 | 5/2012 | Lai et al. |
| 2012/0113331 A1 | 5/2012 | Takata |
| 2012/0169961 A1 | 7/2012 | Ha et al. |

FOREIGN PATENT DOCUMENTS

| | | |
|---|---|---|
| CN | 1839279 A | 9/2006 |
| CN | 201666514 U | 12/2010 |
| CN | 102331640 A | 1/2012 |
| EP | 1 302 788 A1 | 4/2003 |
| JP | H03-011502 A | 1/1991 |
| JP | 11-174417 A | 7/1999 |
| JP | 2007-242410 A | 9/2007 |
| JP | 2008-243386 A | 10/2008 |
| JP | 2009-224076 A | 10/2009 |
| JP | 2010-033861 A | 2/2010 |
| TW | 200611010 A | 4/2006 |
| TW | 2008-23539 A | 6/2008 |
| TW | 201035630 A1 | 10/2010 |
| TW | 201217862 A | 5/2012 |
| WO | WO 2006/031043 A1 | 3/2006 |
| WO | WO 2007/140092 A1 | 12/2007 |
| WO | WO 2008/047785 A1 | 4/2008 |
| WO | WO 2011/013405 A1 | 2/2011 |

OTHER PUBLICATIONS

Office Action for Japanese Patent Application No. JP 2013-258183, Dec. 22, 2015, 5 Pages. (With Concise Explanation of Relevance).

Office Action for Taiwanese Patent Application No. TW 102147038, Nov. 11, 2015, 8 Pages.

Office Action for Chinese Patent Application No. CN 201310714206.6, Jun. 2, 2016, 16 Pages.

Office Action for Taiwanese Patent Application No. TW 10520641310, May 25, 2016, 13 Pages.

\* cited by examiner

DISPLAY DEVICE

CROSS REFERENCE TO RELATED APPLICATIONS

This application claims priority under 35 U.S.C. §119(a) from Korean Patent Application No. 10-2013-0059764 filed on May 27, 2013, which is hereby incorporated by reference as if fully set forth herein.

BACKGROUND

1. Field of the Disclosure

Embodiments of the present invention relate to a display device with slimness and narrowness.

2. Discussion of the Related Art

A related art liquid crystal display (LCD) device displays an image by controlling a light transmittance of liquid crystal having dielectric anisotropy through the use of electric field. To this end, as shown in Figure (FIG. 1 which illustrates a cross sectional view of the related art LCD device, the related art LCD device may include a liquid crystal panel 10, a backlight unit 20, and a case top 30.

Figure 1:
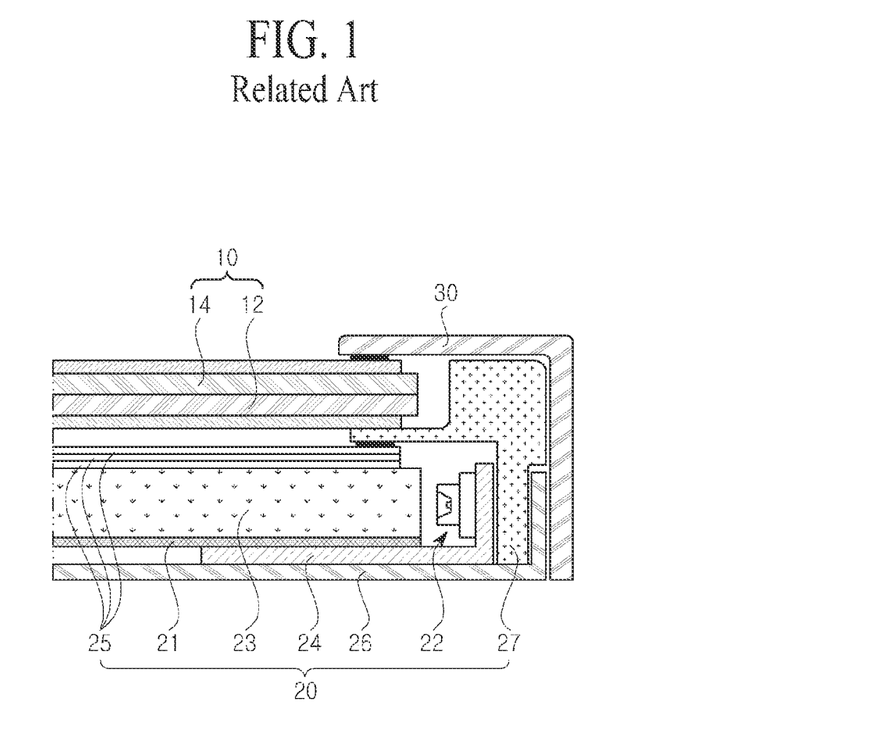
FIG. 1 is a cross sectional view illustrating a related art LCD device.

In detail, the liquid crystal panel 10 includes a thin film transistor substrate 12 and a color filter substrate 14 confronting each other, wherein the two substrates 12 and 14 are bonded to each other with a liquid crystal layer interposed there between.

Also, a polarizing member (not shown) may be attached to each of lower and upper surfaces of the liquid crystal panel 10.

The backlight unit 20 may include a reflective sheet 21, a light source 22 for providing light to the liquid crystal panel 10, a light guide plate 23, a housing 24 for supporting the light source 22, a plurality of optical sheets 25, a cover bottom 26, and a guide panel 27.

In detail, the reflective sheet 21 reflects light leaking in the light guide plate 23 toward the liquid crystal panel 10.

The light source 22 includes a light emitting diode (LED) package, and a printed circuit board for supplying power to the LED package.

The housing 24 is provided to support the light source 22. The light source 22 may be combined with a lateral side of the housing 24.

The light guide plate 23 guides light, which is emitted from the light source 22, toward the liquid crystal panel 10, wherein the light guide plate 23 is formed of PMMA (Poly Methyl MethAcrylate) or glass material.

The plurality of optical sheets 25 diffuse and concentrate the light passing through the light guide plate 23, and then provides the light to the liquid crystal panel 10.

The cover bottom 26 provides a space for receiving the light source 22, the reflective sheet 21, the light guide plate 23 and the plurality of optical sheets 25 therein, and simultaneously supports the guide panel 27.

The guide panel 27 supports the liquid crystal panel 10. As shown in FIG. 1, the guide panel 27 may include a panel supporter for supporting the liquid crystal panel 10, and a sidewall for covering the backlight unit 20.

The case top 30 covers an upper edge of the liquid crystal panel 10, and also covers lateral surfaces of the cover bottom 26 and the guide panel 27.

Referring to FIG. 1, the related art LCD device includes structures such as the cover bottom 26, the guide panel 27, the case top 30, and the plurality of optical sheets 25, whereby the related art LCD device is increased in its thickness and bezel.

SUMMARY

Accordingly, embodiments of the present invention are directed to a display device that substantially obviates one or more problems due to limitations and disadvantages of the related art.

An aspect of embodiments of the present invention is directed to provide a display device which eliminates structures such as a case top, a guide panel and a cover bottom, and includes a light guide formed as a single body with a liquid crystal panel.

Another aspect of embodiments of the present invention is directed to provide a display device including a reflector which is formed of organic material or organic material/metal compound, and is combined with a light guide.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device that may include a liquid crystal panel; a light source for providing light to the liquid crystal panel; a light guide formed of a glass material, wherein the light source is combined with one side of the light guide; a reflector formed on at least one surface of the light guide, wherein the reflector includes an organic material and a metal compound; and an adhesive member formed on one surface of the light guide, the one surface of the light guide facing the liquid crystal panel, and the adhesive member configured to attach the liquid crystal panel and the light guide to each other.

In the display device, the reflector may include a reflection pattern formed of the metal compound and combined with another surface of the light guide facing away from the liquid crystal panel; and an organic layer for covering the reflection pattern, wherein the organic layer is formed of the organic material and is combined with said another surface of the light guide facing away from the liquid crystal panel.

The reflection pattern is formed of the metal compound of any one of MoTi and AlNd, and the reflection pattern regularly reflects the light to the liquid crystal panel, or scatters and reflects the light to the liquid crystal panel.

In addition, the reflector may further include any one of an optical pattern combined with the one surface of the light guide, and an organic layer pattern formed of the organic material and combined with the one surface of the light guide.

In another aspect of embodiments of the present invention, there is provided a display device that may include a liquid crystal panel; a light source for providing light to the liquid crystal panel; a plurality of light guides formed of a glass material, wherein the light source is combined with one side of any one of the plurality of light guides; a reflector formed on at least one surface of any one of the plurality of light guides, wherein the reflector includes an organic material and a metal compound; and an adhesive member formed on the one surface of one of the plurality of light guides, the one surface of the one of the plurality of light guides facing the liquid crystal panel, and the adhesive member configured to attach the plurality of light guides to the liquid crystal panel.

In the display device, the plurality of light guides may include a first light guide member combined with a lower surface of the liquid crystal panel, wherein a first surface of the first light guide member faces the liquid crystal panel and is combined with the adhesive member; and a second light guide member combined with a second surface of the first light guide member, wherein the reflector is combined with at least any one surface of any one of the first light guide member and the second light guide member.

Also, the reflector may include a reflection pattern formed of a metal compound and combined with a first surface of the second light guide member facing away from the first light guide member; and an organic layer formed of an organic material and combined with the first surface of the second light guide member, wherein the organic layer covers the reflection pattern, wherein the metal compound comprises any one of MoTi and AlNd, the reflection pattern regularly reflects the light to the liquid crystal panel, or scatters and reflects the light to the liquid crystal panel.

In addition, the reflector may further include any one of an optical pattern combined with the first surface of the first light guide member, and an organic layer pattern formed of the organic material and combined with the first surface of the first light guide member.

Furthermore, the reflector may further include any one of an optical pattern combined with a second surface of the second light guide member, the second surface of the second light guide member facing the first light guide member, and an organic layer pattern formed of the organic material and combined with the second surface of the second light guide member.

A width of the organic layer pattern may be within a range of 2 µm~100 µm, and a height of the organic layer pattern may be within a range of 2 µm~100 µm.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

Also, various elements included in the present invention may be described by the use of terms such as first, second elements and etc. However, the elements of the present invention are not limited to these terms. These terms are used only to differentiate one element from other elements.

On explanation about the embodiments of the present invention, if it is considered that the substance of the present invention is clouded by a detailed explanation for the related art, the detailed explanation for the related art will be omitted.

Hereinafter, embodiments of the present invention will be described in detail with reference to the accompanying drawings.

Figure 2A:
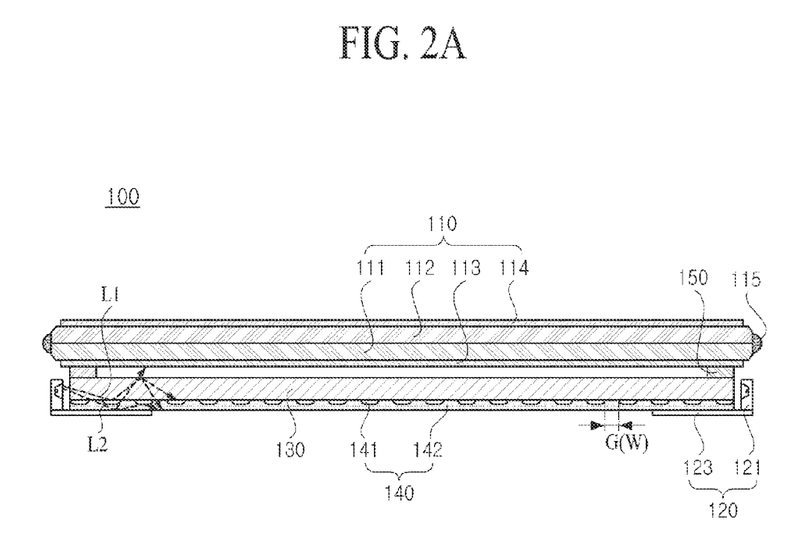
FIGS. 2A and 2B are cross sectional views illustrating a display device according to an embodiment of the present invention.

FIG. 2A is a cross sectional view illustrating a display device 100 according to an embodiment of the present invention. As shown in FIG. 2A, the display device 100 according to an embodiment of the present invention may include a liquid crystal panel 110, one or more light sources 120, a light guide 130, a reflector 140, and an adhesive member 150.

In detail, referring to FIG. 2A, the liquid crystal panel 110 includes a first substrate 111, a second substrate 112, and a liquid crystal layer (not shown) formed between the first and second substrates 111 and 112.

On the first substrate 111, there are signal lines of gate and data lines (not shown), and a thin film transistor (hereinafter, referred to as "TFT") formed adjacent to a crossing portion of the gate and data lines.

Also, a pixel electrode is formed in a pixel region defined by crossing the gate and data lines, and a pad region is formed at one side of the first substrate 111, wherein the pad region is connected with each of the gate and data lines.

As a tape carrier package (not shown), on which a driver integrated circuit for applying a driving signal to the TFT is mounted, is attached to the pad region, a data signal is supplied to the data line from the driver integrated circuit, and a scan signal is supplied to the gate line from the driver integrated circuit.

On the second substrate 112, there are a color filter, a common electrode, and a black matrix.

A first polarizing member 113 is formed on a lower surface of the first substrate 111, wherein the first polarizing member 113 polarizes light which is provided from the one or more light sources 120 and is passed through the light guide 130.

A second polarizing member 114 is formed on an upper surface of the second substrate 112, wherein the second polarizing member 114 enables a user to watch an image.

As the light provided from the one or more light sources 120 passes through the liquid crystal layer, an image is displayed on the liquid crystal panel 110.

In addition, side sealing portions 115 may be formed along the circumference of the liquid crystal panel 110, that is, four sides of the liquid crystal panel 110, thereby preventing the liquid crystal panel 110 from being damaged by an external shock, and preventing a light leakage.

The one or more light sources 120 provide the light toward the liquid crystal panel 110. In detail, each of the one or more light sources 120 may include a plurality of LED packages 121, and a power supply member 123.

The power supply member 123 is provided with a receiving area to be combined with the plurality of LED packages 121. Except the receiving area, the remaining areas of the power supply member 123 are combined with a rear surface of the light guide 130.

In an embodiment of the present invention, each of the one or more light sources 120 is combined with the light guide 130 through the power supply member 123. However, the plurality of LED packages 121 and the light guide 130 may be combined by applying an epoxy, silicon or acryl material in between, and forming a transparent adhesive member whose refractive index is not less than '1'.

The one or more light sources 120 according to an embodiment of the present invention are combined with two sides of the light guide 130 facing each other. Alternatively, it is possible to combine the one or more light sources 120 with all sides or any one side of the light guide 130.

Preferably, one of the one or more light sources 120 is combined with one side of the light guide 130, and the light guide 130 is formed of a glass material so that the light provided from the one of the one or more light sources 120 is guided toward the liquid crystal panel 110.

In detail, the light guide 130 is formed of the glass material containing silicon (Si) compound. According to a selection of those skilled in the art, the light guide 130 may be formed of soda lime glass, borosilicate glass, or quartz glass.

The reflector 140 may be formed on at least any one of one and the other surfaces of the light guide 130. The reflector 140 may include an organic material and a metal compound.

The reflector 140 according to an embodiment of the present invention may include a reflection pattern 141 and an organic layer 142. The reflection pattern 141 is formed on the other surface of the light guide 130, that is, a rear surface of the light guide 130 facing away from the liquid crystal panel 110, and the reflection pattern 141 is formed of the metal compound. Also, the organic layer 142 is formed of the organic material, wherein the organic layer 142 covering the reflection pattern 141 is formed on the other surface of the light guide 130, that is, the rear surface of the light guide 130.

The reflection pattern 141 is formed of the metal compound. More particularly, the reflection pattern 141 may be formed of alloy (MoTi) of molybdenum and titanium, or alloy (AlNd) of aluminum and neodymium.

Through the use of reflection pattern 141 of the metal compound, the light provided from the one or more light sources 120 is regularly reflected toward the liquid crystal panel 110, or scattered and reflected toward the liquid crystal panel 110.

In more detail, a path of the light provided from the one or more light sources 120 will be described with reference to FIG. 2A. The light provided from the one or more light sources 120 proceeds toward the inside of the light guide 130, wherein a portion (L1) of the light may proceed toward the reflection pattern 141.

In this case, the reflection pattern 141 may provide the light (L1) to the liquid crystal panel 110. In addition, another portion of the light which is not provided to the liquid crystal panel 110 is again reflected toward the inside of the light guide 130, whereby the reflected light proceeds toward the inside of the organic layer 142 or the neighboring reflection pattern 141.

Also, another portion (L2) of the light proceeding toward the inside of the light guide 130 may proceed toward the inside of the organic layer 142. In this case, the light (L2) is totally reflected on the inside of the organic layer 142 so that the light leaks in the gap (G) between the neighboring reflection patterns 141, whereby the light is provided to the liquid crystal panel 110.

Also, some of the light which does not leak in the gap (G) between the neighboring reflection patterns 141 collides with the adjacent reflection pattern 141 so that the light again proceeds toward the inside of the organic layer 142.

The width of the gap (G) between the neighboring reflection patterns 141 may vary. As the reflection patterns 141 are positioned more distant from the one or more light sources 120, the width (W) of the gap (G) may be gradually increased or decreased.

That is, as shown in FIG. 2A, when the one or more light sources 120 are combined with two sides of the light guide 130 facing each other, the width (W) of the gap (G) between the neighboring reflection patterns 141 is gradually increased as the reflection patterns 141 become adjacent to the center of the light guide 130.

The adhesive member 150 is formed on one surface of the light guide 130 confronting the liquid crystal panel 110, to thereby combine the liquid crystal panel 110 and the light guide 130 with each other.

Preferably, as shown in FIG. 2A, the adhesive member 150 is formed of a sealant of black-colored silicon material which prevents surrounding air from flowing into the inside of the display device 100 through a gap between the liquid crystal panel 110 and the light guide 130, and enhances an adhesive strength between the liquid crystal panel 110 and the light guide 130.

The adhesive member 150 according to an embodiment of the present invention may be selected from OCA (Optical Clear Adhesive) of optical transparent adhesive, both-sided tape, or foam pad having both sides coated with an adhesive material.

Figure 2B:
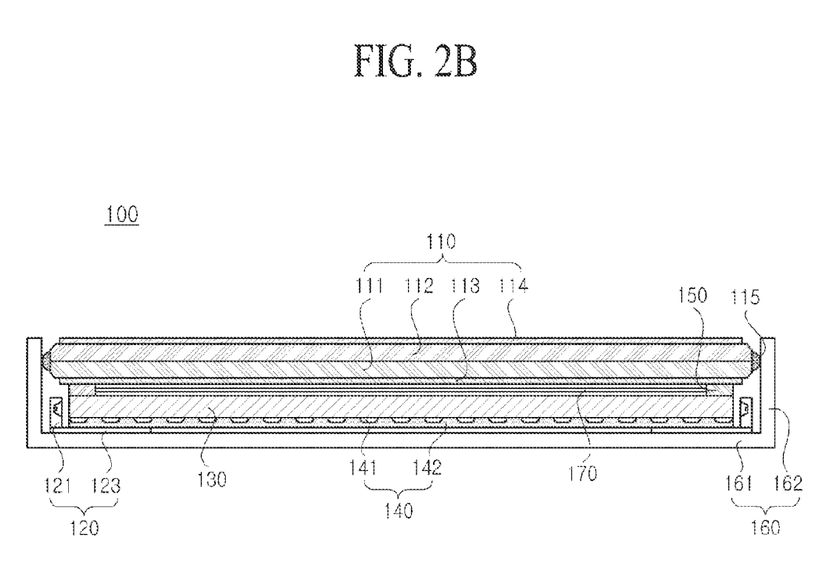

As shown in FIG. 2B, the display device 100 according an embodiment of the present invention may further include a lower cover 160, and a plurality of optical members 170.

In detail, the lower cover 160 may include a lower plate 161 for providing a space to receive the liquid crystal panel 110, the one or more light sources 120 and the light guide 130 therein, and a sidewall plate 162 vertically bent from the lower plate 161 in a direction of the liquid crystal panel 110. The lower cover 160 is combined with the other surface of the light guide 130, that is, the rear surface of the light guide 130.

The lower cover 160 protects the liquid crystal panel 110 and the light guide 130 from external shocks and foreign matters.

As the plurality of optical members 170 are combined between the liquid crystal panel 110 and the light guide 130, it is possible to diffuse and concentrate the light provided from the light guide 130 to the liquid crystal panel 110, thereby improving uniformity of luminance.

Figure 3:
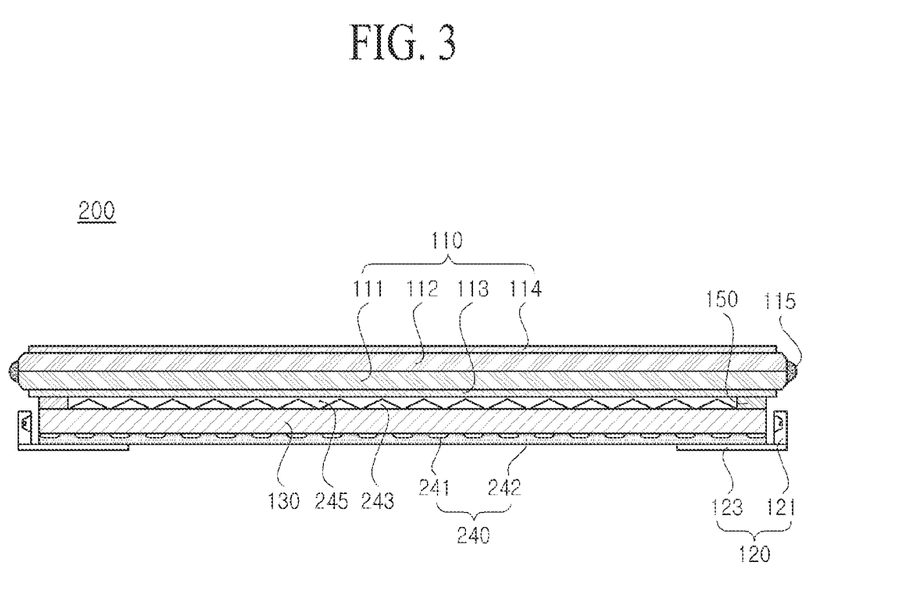
FIG. 3 is a cross sectional view illustrating a display device according to another embodiment of the present invention.

FIG. 3 is a cross sectional view illustrating a display device according to another embodiment of the present invention, and FIGS. 4A to 4D are a perspective view illustrating various examples of reflector shown in FIG. 3.

Hereinafter, the display device according to another embodiment of the present invention will be described in detail, and a detailed explanation for the same structures as those of the above embodiment of the present invention will be omitted.

Referring to FIG. 3, the display device 200 according to another embodiment of the present invention may include a liquid crystal panel 110, one or more light sources 120, a light guide 130, a reflector 240, and an adhesive member 150. The reflector 240 may include a reflection pattern 241 and an organic layer 242, which are the same as the reflection pattern 141 and the organic layer 142 shown in FIG. 2A. In addition, the reflector 240 may further include an optical pattern 243 formed on one surface of the light guide 130 confronting the liquid crystal panel 110, that is, the upper surface of the light guide 130.

Figure 4A:
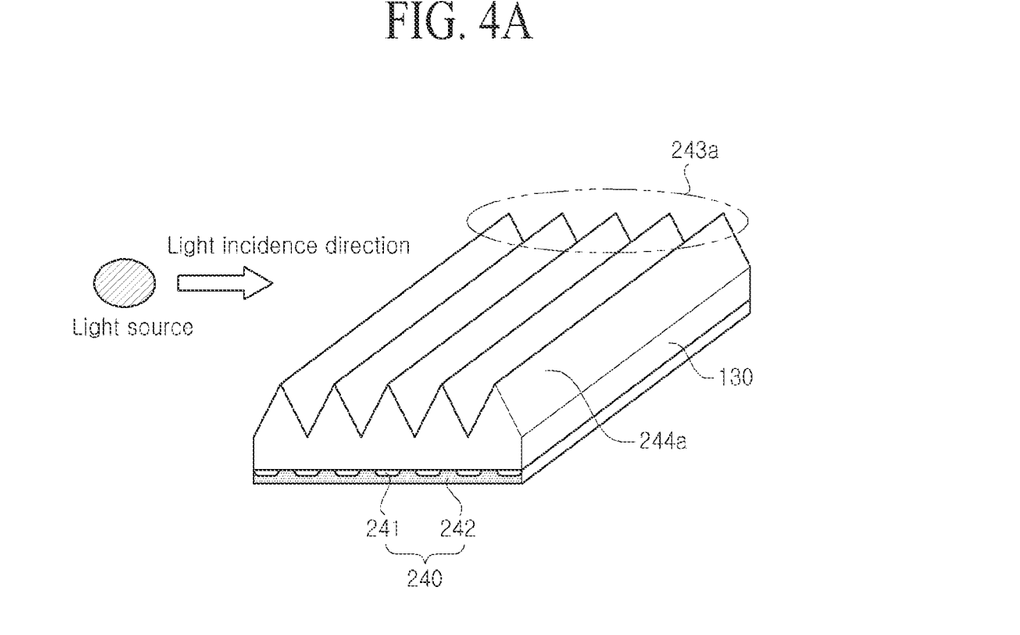
FIGS. 4A to 4D are a perspective view illustrating various examples of reflector shown in FIG. 3.

In detail, as shown in FIG. 4A which shows various examples of the optical pattern of the reflector 240, an optical pattern 243a formed on the upper surface of the light guide 130 may be a prism pattern 244a.

Figure 4B:
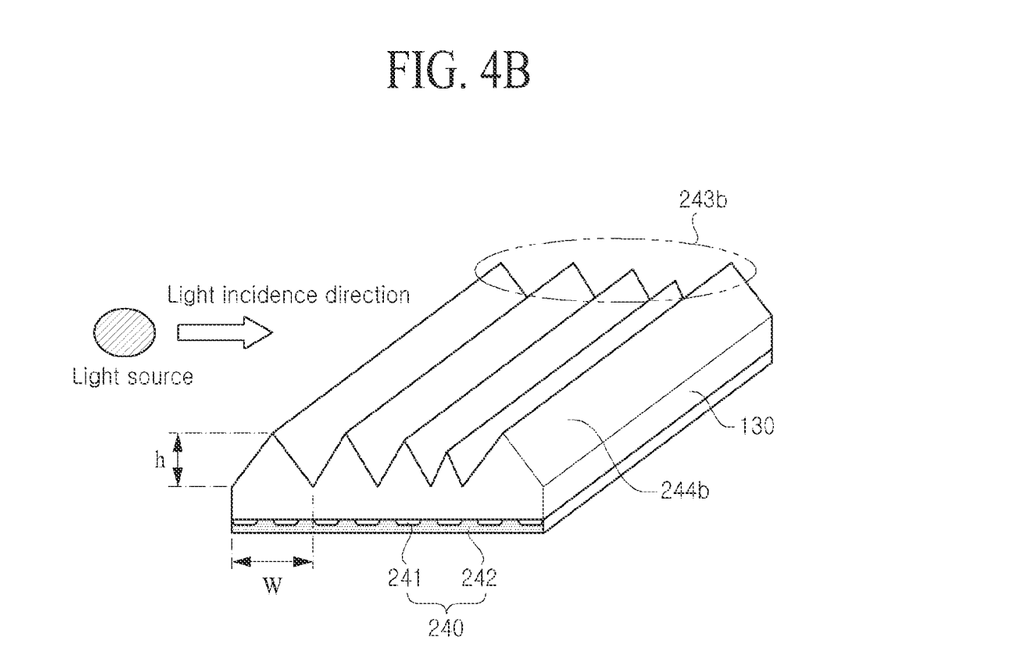
Figure 4C:
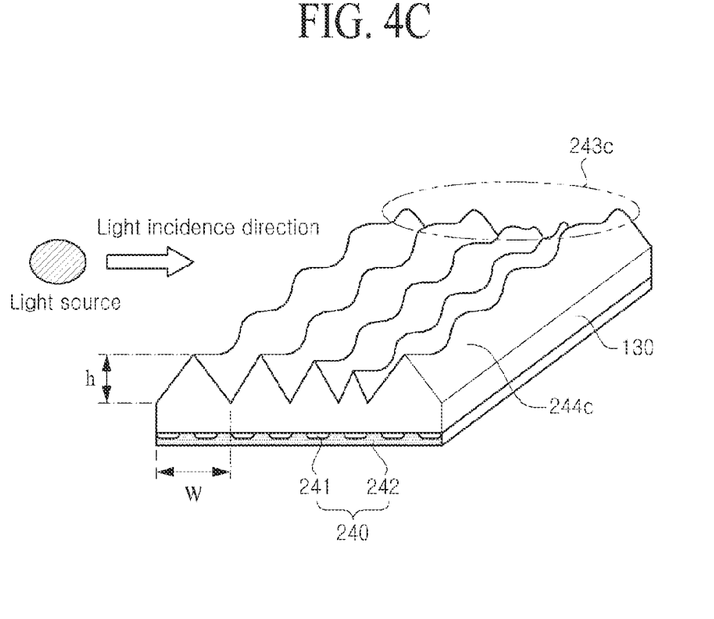

Also, as shown in FIG. 4B, an optical pattern 243b formed on the upper surface of the light guide 130 may be a prism pattern 244b with different heights (h) and different widths (w). As shown in FIG. 4C, an optical pattern 243c may be a wave pattern 244c with different heights (h) and different widths (w).

Figure 4D:
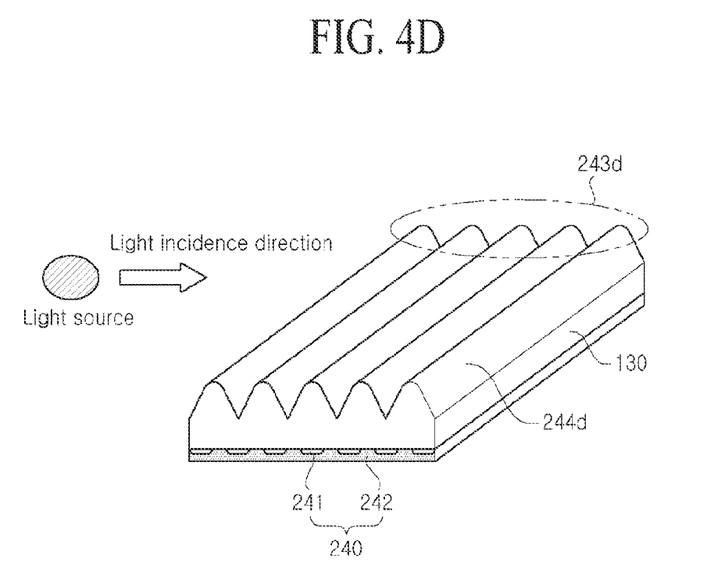

As shown in FIG. 4D, an optical pattern 243d may be a prism pattern 244d with round-shaped vertex. In addition to the various optical patterns 244a, 244b, 244c and 244d shown in FIGS. 4A to 4D, the reflector 240 may be formed in various optical patterns and formed on the upper surface of the light guide 130.

In order to combine the above optical pattern 243 with the upper surface of the light guide 130 of the glass material, it is possible to carry out a deposition and photo exposure process or an etching process.

Accordingly, a certain gap is maintained between the liquid crystal panel 110 and the light guide 130 owing to the optical pattern 243 formed on the upper surface of the light guide 130 so that it is possible to form a medium layer (air layer) 245.

The display device 200 according to another embodiment of the present invention may include a lower cover and a plurality of optical members which are the same as the lower cover 160 and the plurality of optical members 170 included in the above display device 100 described with reference to FIG. 2B.

Figure 5:
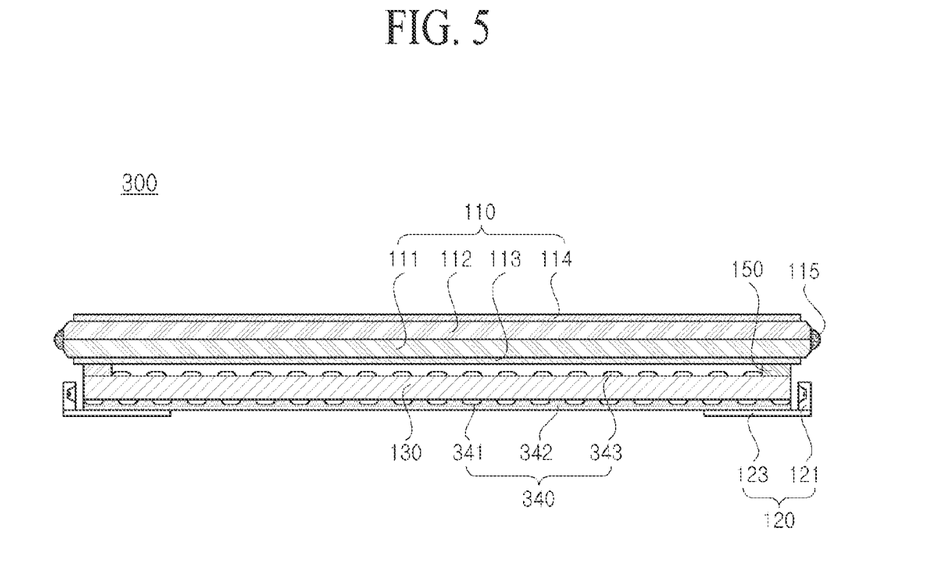
FIG. 5 is a cross sectional view illustrating a display device according to another embodiment of the present invention.

FIG. 5 is a cross sectional view illustrating a display device according to another embodiment of the present invention.

Hereinafter, the display device according to another embodiment of the present invention will be described in detail, and a detailed explanation for the same structures as those of the above embodiment of the present invention will be omitted.

As shown in FIG. 5A, the display device 300 according to another embodiment of the present invention may include a liquid crystal panel 110, one or more light sources 120, a light guide 130, a reflector 340, and an adhesive member 150. The reflector 340 may include a reflection pattern 341, an organic layer 342, and an organic layer pattern 343.

In detail, the reflection pattern 341 is formed of a metal compound, and is combined with the other surface of the light guide 130, that is, the rear surface of the light guide 130 facing away from the liquid crystal panel 110. More particularly, the reflection pattern 341 may be formed of any one of metal compounds such as alloy (MoTi) of molybdenum and titanium and alloy (AlNd) of aluminum and neodymium. Through the use of reflection pattern 341 of the metal compound, the light provided from the one or more light sources 120 is regularly reflected toward the liquid crystal panel 110, or scattered and reflected toward the liquid crystal panel 110.

Also, the organic layer 342 is formed of an organic material, and is combined with the other surface of the light guide 130, that is, the rear surface of the light guide 130, to thereby cover the reflection pattern 341.

The organic layer pattern 343 is formed of an organic material, and is combined with one surface of the light guide 130 confronting the liquid crystal panel 110, that is, the upper surface of the light guide 130 by deposition and photo exposure process or etching process.

Also, a width of the organic layer pattern 343 may be selectively formed within a range of 2 μm~100 μm, and a height of the organic layer pattern 343 may be selectively formed within a range of 2 μm~100 μm.

The plurality of organic layer patterns 343 may be provided in such a manner that they may become more compact in the center of the light guide 130 in comparison to an area adjacent to each end of the light guide 130. Meanwhile, the more the organic layer patterns 343 may be positioned away from the one or more light sources 120, the more compact the organic layer patterns 343 may be.

In addition to the reflection pattern 341 and the organic layer 342 combined with the rear surface of the light guide 130, the organic layer pattern 343 is combined with the upper surface of the light guide 130 so that it is possible to better diffuse and concentrate the light provided from the one or more light sources 120 to the liquid crystal panel 110, thereby improving the luminance. Thus, the above described structure of the organic layer pattern 343 in addition to the reflection pattern 341 and the organic layer 342 may function as an optical sheet of the related art LCD device.

Also, the display device 300 according to another embodiment of the present invention may include a lower cover and a plurality of optical members which are the same as the lower cover 160 and the plurality of optical members 170 included in the above display device 100 described with reference to FIG. 2B.

Figure 6:
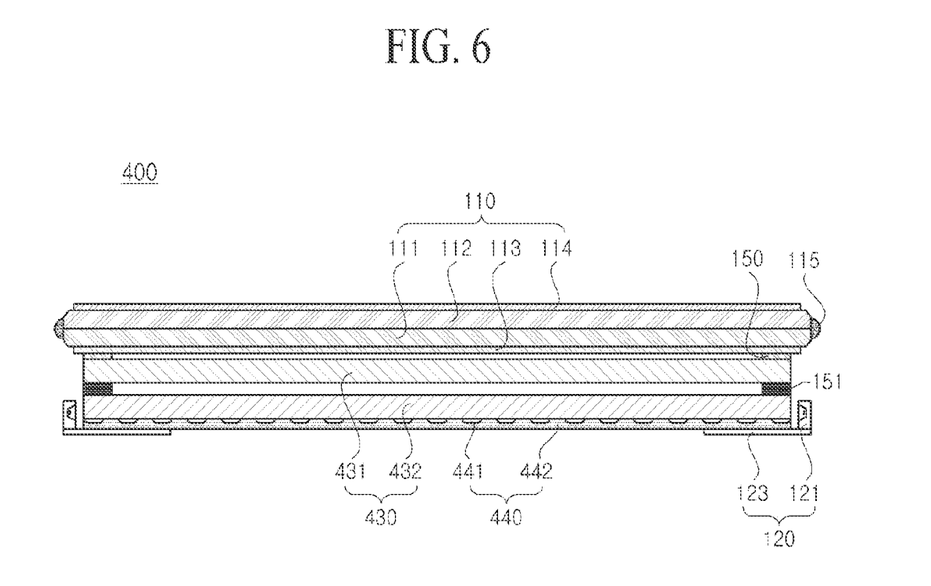
FIG. 6 is a cross sectional view illustrating a display device according to another embodiment of the present invention.
Figure 7A:
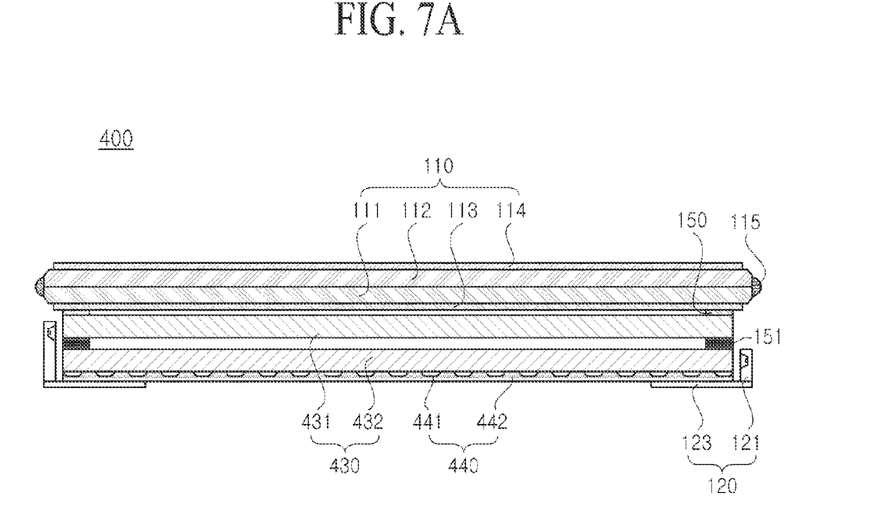
FIGS. 7A and 7B are a cross sectional view illustrating various examples of combination position of light sources shown in FIG. 6.
Figure 7B:
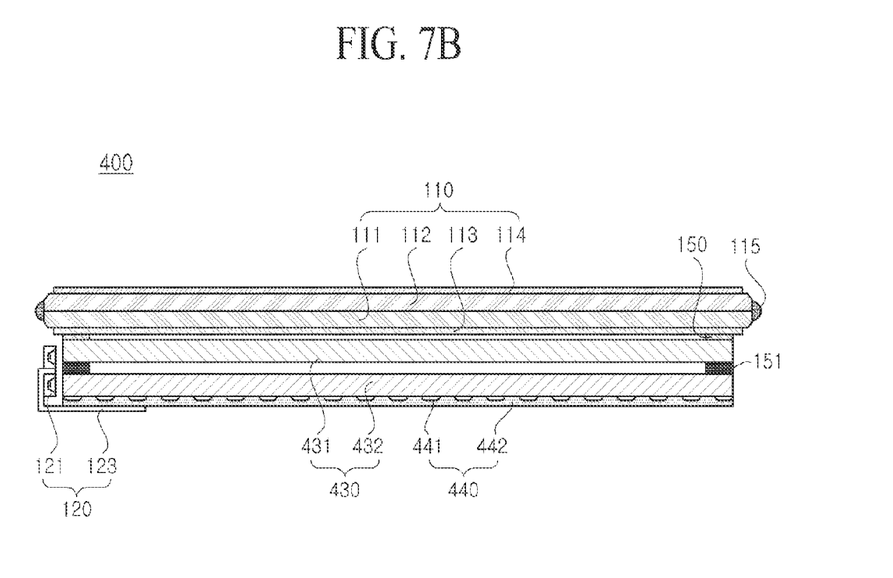

FIG. 6 is a cross sectional view illustrating a display device according to another embodiment of the present invention. FIGS. 7A and 7B are a cross sectional view illustrating various examples of combination position of light sources shown in FIG. 6.

Hereinafter, the display device according to another embodiment of the present invention will be described in detail, and a detailed explanation for the same structures as those of the above embodiment of the present invention will be omitted.

As shown in FIG. 6, the display device 400 according to another embodiment of the present invention may include a liquid crystal panel 110, one or more light sources 120, a plurality of light guides 430, a reflector 440, and an adhesive member 150.

In detail, the plurality of light guides 430 are formed of a glass material, and at least one of the one or more light sources 120 may be combined with one side of at least any one of the light guides 430.

That is, as shown in FIG. 6, the plurality of light guides 430 may include a first light guide member 431 and a second light guide member 432.

Also, one surface of the first light guide member 431 confronting the liquid crystal panel 110 is combined with the adhesive member 150, whereby the first light guide member 431 is combined with a lower surface of the liquid crystal panel 110. Then, the second light guide member 432 is combined with a lower surface of the first light guide member 431.

The first light guide member 431 and the second light guide member 432 may be combined with each other by an adhesive member 151 which is the same as the above adhesive member 150 used for combination of the liquid crystal panel 110 and the first light guide member 431.

The reflector 440 may be combined with at least any one of one and the other surfaces in any one of the first light guide member 431 and the second light guide member 432. That is, the reflector 440 may include a reflection pattern 441 and an organic layer 442 which are the same as those of the reflector 140 shown in FIG. 2A.

In more detail, the reflection pattern 441 is formed of a metal compound, and is combined with the other surface of the second light guide member 432, that is, a rear surface of the second light guide member 432 facing away from the first light guide member 431. More particularly, the reflection pattern 441 may be formed of any one of metal compounds such as alloy (MoTi) of molybdenum and titanium and alloy (AlNd) of aluminum and neodymium. Through the use of reflection pattern 441 of the metal compound, the light provided from the one or more light sources 120 is regularly reflected toward the first light guide member 431 or liquid crystal panel 110, or scattered and reflected toward the first light guide member 431 or liquid crystal panel 110.

Also, the organic layer 442 is formed of an organic material, and is combined with the other surface of the second light guide member 432, that is, the rear surface of the second light guide member 432, to thereby cover the reflection pattern 441 combined with the rear surface of the second light guide member 432.

As shown in FIGS. 7A and 7B showing various examples of the combination position of light sources according to the embodiments of the present invention, at least one of the one or more light sources 120 may be combined with at least any one of the first and second light guide members 431 and 432.

In detail, the one or more light sources 120 may be provided at different sides of the respective first and second light guide members 431 and 432. As shown in FIG. 7A, one of the one or more light sources 120 is provided at one side of the first light guide member 431, and the other of the one or more light sources 120 is provided at the other side of the second light guide member 432, facing opposite the direction of the one side of the first light guide member 431. Thus, the one or more light sources 120 are respectively combined with one side of the first light guide member 431 and the other side of the second light guide member 432, so that the light is provided from the one or more light sources 120 obliquely facing each other.

Also, the one or more light sources 120 may be provided at the same sides of the respective first and second light guide members 431 and 432. As shown in FIG. 7B, one of the one or more light sources 120 may be provided at one side of the first light guide member 431, and the other of the one or more light sources 120 may be provided at one side of the second light guide member 432, facing the same direction of the one side of the first light guide member 431. Thus, the one or more light sources 120 are respectively combined with the one side of the first light guide member 431 and the one side of the second light guide member 432, so that it is possible to provide the light toward the same direction.

The display device 400 according to another embodiment of the present invention may include a lower cover and a plurality of optical members which are the same as the lower cover 160 and the plurality of optical members 170 included in the above display device 100 described with reference to FIG. 2B.

Figure 8A:
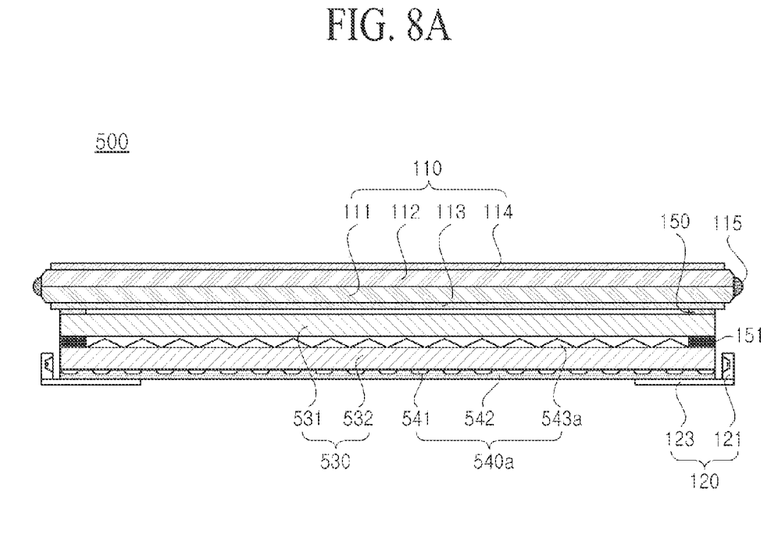
FIGS. 8A and 8B are a cross sectional view illustrating a display device according to another embodiment of the present invention.
Figure 8B:
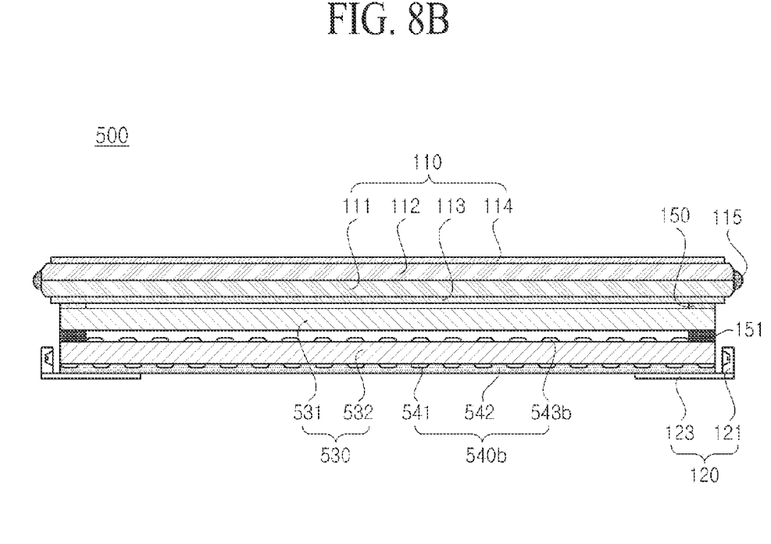

FIGS. 8A and 8B are a cross sectional view illustrating a display device according to another embodiment of the present invention.

Hereinafter, the display device according to another embodiment of the present invention will be described in detail, and a detailed explanation for the same structures as those of the above embodiment of the present invention will be omitted.

As shown in FIG. 8A, the display device 500 according to another embodiment of the present invention may include a liquid crystal panel 110, one or more light sources 120, a plurality of light guides 530, reflectors 540a and 540b, and an adhesive member 150.

In detail, the plurality of light guides 530 are formed of a glass material, and one of the one or more light sources 120 may be combined with one side in any one of the light guides 530.

That is, the plurality of light guides 530 may include a first light guide member 531 and a second light guide member 532.

The reflector 540a may be combined with at least any one of one and the other surfaces in any one of the first light guide member 531 and the second light guide member 532.

In more detail, the reflector 540a may include a reflection pattern 541 and an organic layer 542 which are the same as the reflection pattern 441 and the organic layer 442 shown in FIG. 6, and additionally include an optical pattern 543a combined with the one surface of the second light guide member 532 confronting the first light guide member 531, that is, the upper surface of the second light guide member 532.

That is, the reflection pattern 541 and the organic layer 542 are combined with the rear surface of the second light guide member 532 facing away from the first light guide member 531, and the optical pattern 543a is combined with the upper surface of the second light guide member 532.

Referring to FIG. 8B, the reflector 540b may include a reflection pattern 541 and an organic layer 542, and additionally include an organic layer pattern 543b formed of an organic material and combined with the one surface of the second light guide member 532 confronting the first light guide member 531, that is, the upper surface of the second light guide member 532.

FIGS. 9A to 9F are a cross sectional view illustrating a display device according to another embodiment of the present invention.

Hereinafter, the display device according to another embodiment of the present invention will be described in detail, and a detailed explanation for the same structures as those of the above embodiment of the present invention will be omitted.

As shown in FIGS. 9A to 9F, the display device 600 according to another embodiment of the present invention may include a liquid crystal panel 110, one or more light sources 120, a plurality of light guides 630, reflectors 640a, 640b, 640c, 640d, 640e and 640f, and an adhesive member 150.

Figure 9A:
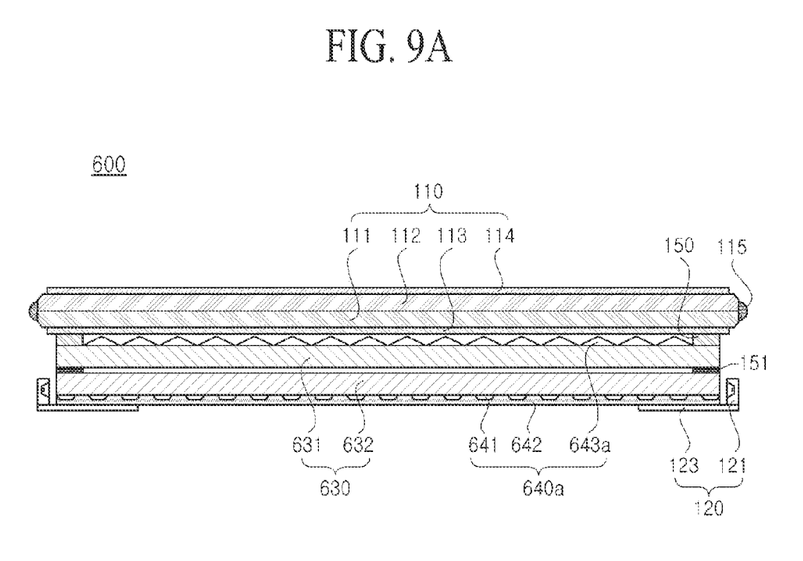
FIGS. 9A to 9F are a cross sectional view illustrating a display device according to another embodiment of the present invention.

That is, as shown in FIG. 9A, the plurality of light guides 630 may include a first light guide member 631 and a second light guide member 632.

The reflector 640a may be combined with at least any one of one and the other surfaces in any one of the first light guide member 631 and the second light guide member 632.

In more detail, the reflector 640 may include a reflection pattern 641 and an organic layer 642 which are the same as the reflection pattern 441 and the organic layer 442 shown in FIG. 6, and additionally include an optical pattern 643a combined with the one surface of the first light guide member 631 confronting the liquid crystal panel 110, that is, the upper surface of the first light guide member 631.

That is, the reflection pattern 641 and the organic layer 642 may be combined with a rear surface of the second light guide member 632 facing away from the first light guide member 631, and the optical pattern 643a may be combined with the upper surface of the first light guide member 631 confronting the liquid crystal panel 110.

Figure 9B:
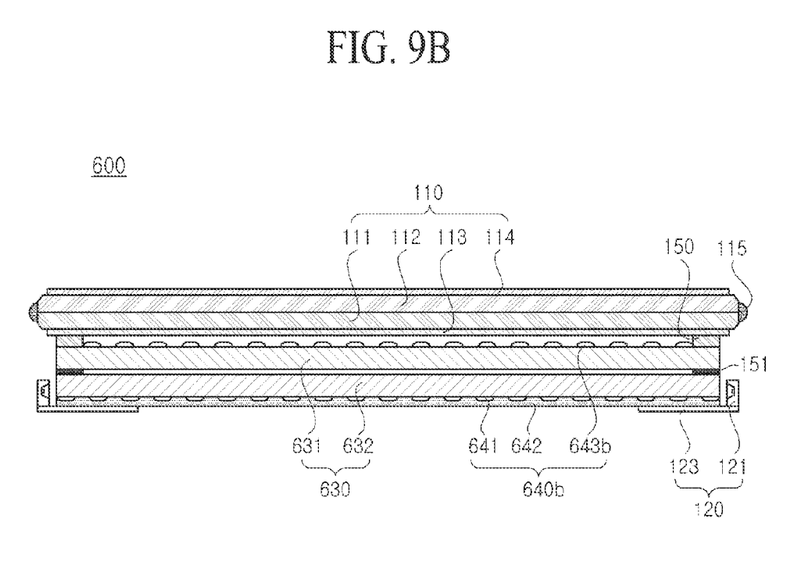

Also, referring to FIG. 9B, the reflector 640b may include a reflection pattern 641 and an organic layer 642, and additionally include an organic layer pattern 643b formed of an organic material and combined with the one surface of the first light guide member 631 confronting the liquid crystal panel 110, that is, the upper surface of the first light guide member 631.

That is, the reflection pattern 641 and the organic layer 642 may be combined with a rear surface of the second light guide member 632 facing away from the first light guide member 631, and the organic layer pattern 643b may be combined with the upper surface of the first light guide member 631 confronting the liquid crystal panel 110.

Figure 9C:
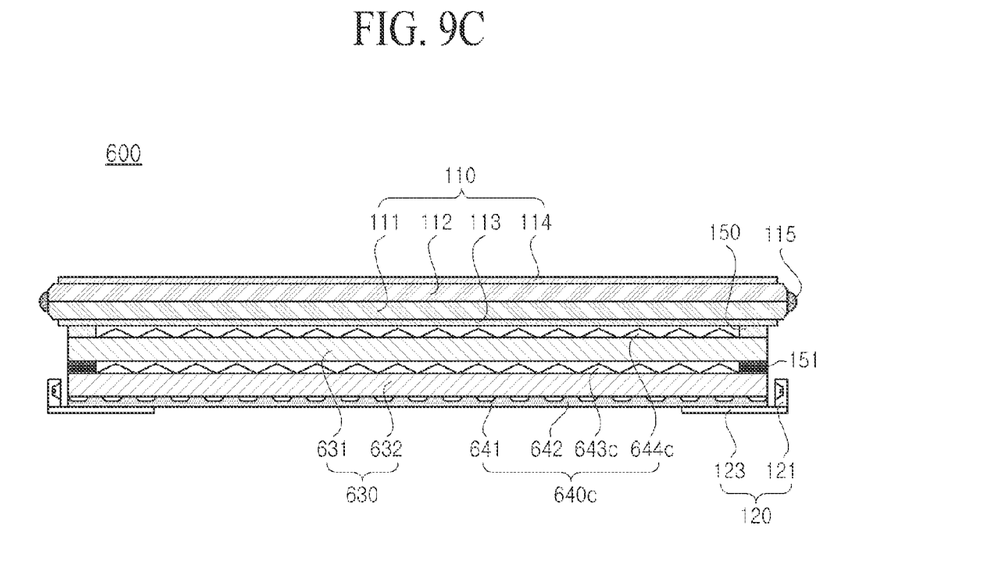

Also, the reflector 640c shown in FIG. 9C may include a reflection pattern 641, an organic layer 642 and an optical pattern 643c which are the same as the reflection pattern 541, the organic layer 542 and the optical pattern 543a shown in FIG. 8A, and additionally include an optical pattern 644c combined with the one surface of the first light guide member 631 confronting the liquid crystal panel 110, that is, the upper surface of the first light guide member 631.

That is, the reflection pattern 641 and the organic layer 642 are combined with a rear surface of the second light guide member 632 facing away from the first light guide member 631, the optical pattern 643c is combined with the upper surface of the second light guide member 632, and the optical pattern 644c is combined with the upper surface of the first light guide member 631 confronting the liquid crystal panel 110.

Figure 9D:
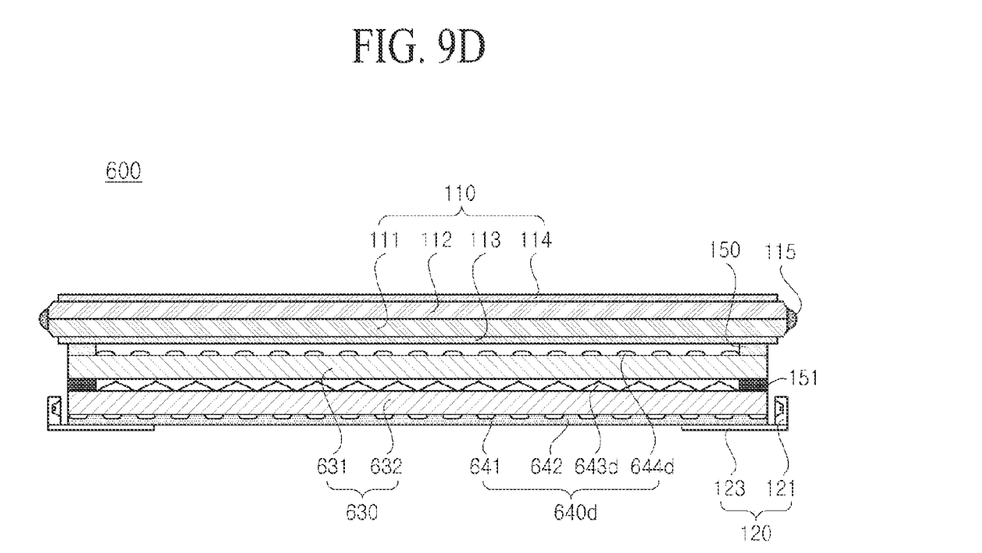

Also, the reflector 640d shown in FIG. 9D may include a reflection pattern 641, an organic layer 642 and an optical pattern 643d which are the same as the reflection pattern 541, the organic layer 542 and the optical pattern 543a shown in FIG. 8A, and additionally include an organic layer pattern 644d combined with the one surface of the first light guide member 631 confronting the liquid crystal panel 110, that is, the upper surface of the first light guide member 631.

That is, the reflection pattern 641 and the organic layer 642 are combined with a rear surface of the second light guide member 632 facing away from the first light guide member 631, the optical pattern 643d is combined with the upper surface of the second light guide member 632, and the organic layer pattern 644d is combined with the upper surface of the first light guide member 631 confronting the liquid crystal panel 110.

Figure 9E:
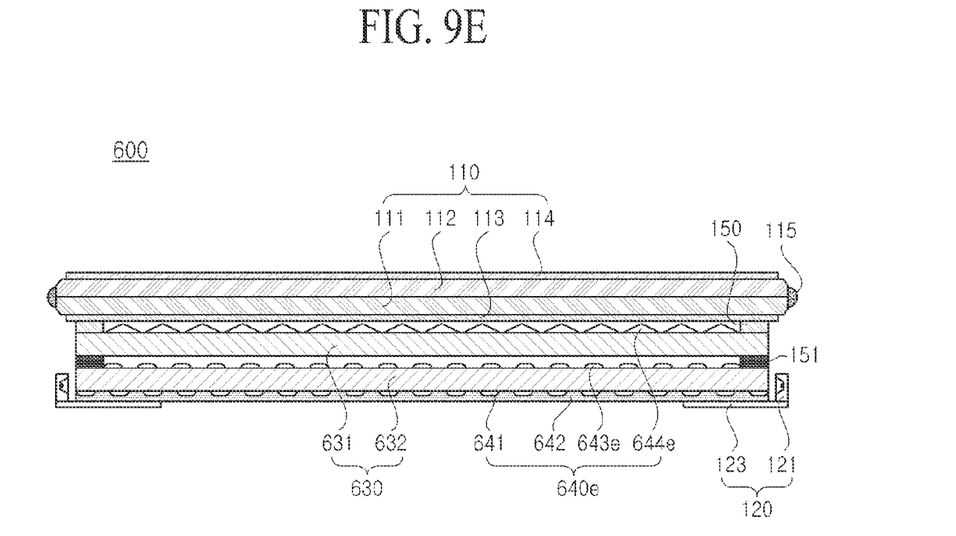

Also, the reflector 640e shown in FIG. 9E may include a reflection pattern 641, an organic layer 642 and an organic layer pattern 643e which are the same as the reflection pattern 541, the organic layer 542 and the organic layer pattern 543b shown in FIG. 8B, and additionally include an optical pattern 644e combined with the one surface of the first light guide member 631 confronting the liquid crystal panel 110, that is, the upper surface of the first light guide member 631.

That is, the reflection pattern 641 and the organic layer 642 are combined with a rear surface of the second light guide member 632 facing away from the first light guide member 631, the organic layer pattern 643e is combined with the upper surface of the second light guide member 632, and the optical pattern 644e is combined with the upper surface of the first light guide member 631 confronting the liquid crystal panel 110.

Figure 9F:
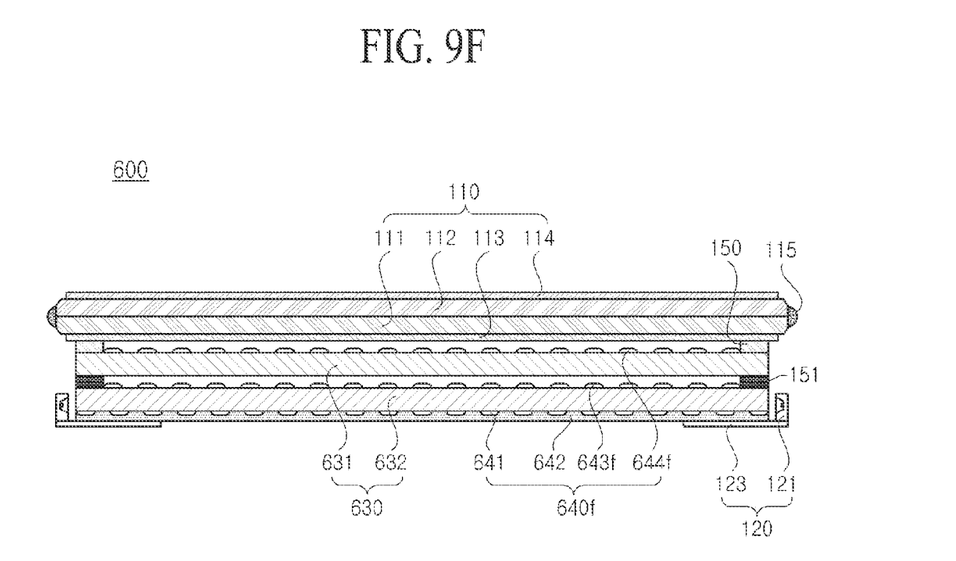

Also, the reflector 640f shown in FIG. 9F may include a reflection pattern 641, an organic layer 642 and an organic layer pattern 643f which are the same as the reflection pattern 541, the organic layer 542 and the organic layer pattern 543b shown in FIG. 8B, and additionally include an organic layer pattern 644f formed of an organic material and combined with the one surface of the first light guide member 631 confronting the liquid crystal panel 110, that is, the upper surface of the first light guide member 631.

That is, the reflection pattern 641 and the organic layer 642 are combined with a rear surface of the second light guide member 632 facing away from the first light guide member 631, the organic layer pattern 643f is combined with the upper surface of the second light guide member 632, and the organic layer pattern 644f is combined with the upper surface of the first light guide member 631 confronting the liquid crystal panel 110.

According to the embodiments of the present invention, it is possible to realize the display device with slimness and narrowness by removing the structures such as case top, guide panel and cover bottom, and forming the liquid crystal panel and the light guide as one body.

Also, the display device according to the present invention is decreased in its manufacturing cost and weight owing to the removal of various structures.

In addition, the reflector which substitutes for the optical sheets of the related art LCD device is used in the display device according to the embodiment of the present invention, to thereby improve the light efficiency and also realize the slimness and narrowness in the display device according to the embodiment of the present invention.

Also, the display device according to the present invention uses the light guide member of the glass material for guiding the light to the liquid crystal panel, thereby preventing thermal deformation by the light source, and improving the light efficiency.

Also, as the optical sheet is selectively combined between the liquid crystal panel and the light guide, it is possible to improve the efficiency of light provided from the light source to the liquid crystal panel.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device comprising:
   a liquid crystal panel;
   a light source for providing light to the liquid crystal panel;
   a light guide comprising a glass material, wherein the light source is disposed on one side of the light guide;
   a reflector including:
      a reflection pattern of discrete metal compound elements dispersed on and protruding from a first surface of the light guide facing away from the liquid crystal panel, and
      an organic layer comprising an organic material, the organic layer covering the reflection pattern of the metal compound elements on the first surface of the light guide, the organic layer in contact with the glass material of the light guide and separating the metal compound elements protruding from the first surface of the light guide; and
   an adhesive member disposed on a second surface of the light guide, the second surface of the light guide facing the liquid crystal panel, and the adhesive member configured to attach the liquid crystal panel and the light guide to each other.

2. The display device of claim 1, wherein the reflection pattern of the metal compound elements comprises any one of MoTi and AlNd, and the reflection pattern regularly reflects the light to the liquid crystal panel, or scatters and reflects the light to the liquid crystal panel.

3. The display device of claim 1, wherein the reflector further includes any one of an optical pattern disposed on the second surface of the light guide, and an organic layer pattern comprising the organic material and disposed on the second surface of the light guide.

4. The display device of claim 3, wherein a width of the organic layer pattern is within a range of 2 μm~100 μm and a height of the organic layer pattern is within a range of 2 μm~100 μm.

5. A display device comprising:
   a liquid crystal panel;
   a light source for providing light to the liquid crystal panel;
   a plurality of light guides including a first light guide member and a second light guide member comprising a glass material, wherein the light source is disposed on one side of any one of the plurality of light guides;
   a reflector including:
      a reflection pattern of discrete metal compound elements dispersed on and protruding from a first surface of the second light guide member of the plurality of light guides facing away from the liquid crystal panel, and
      an organic layer comprising an organic material, the organic layer covering the reflection pattern of the metal compound elements on the first surface of the second light guide member, the organic layer in contact with the glass material of the second light guide member and separating the metal compound elements protruding from the first surface of the second light guide member; and
   an adhesive member disposed on a first surface of the first light guide member, the first surface of the first light guide member facing the liquid crystal panel, and the adhesive member configured to attach the plurality of light guides to the liquid crystal panel.

6. The display device of claim 5, wherein a second surface of the second light guide member facing the liquid crystal panel is coupled to a second surface of the first light guide member facing away from the liquid crystal panel.

7. The display device of claim 6, wherein the reflection pattern of the metal compound elements comprise any one of MoTi and AlNd, and wherein the reflection pattern regularly reflects the light to the liquid crystal panel, or scatters and reflects the light to the liquid crystal panel.

8. The display device of claim 5, wherein the reflector further includes any one of (i) an optical pattern disposed on the first surface of the first light guide member, and (ii) an organic layer pattern comprising the organic material disposed on the first surface of the first light guide member.

9. The display device of claim 5, wherein the reflector further includes any one of (i) an optical pattern disposed on a second surface of the second light guide member, the second surface of the second light guide member facing the first light guide member, and (ii) an organic layer pattern comprising the organic material and disposed on the second surface of the second light guide member.

10. The display device of claim 9, wherein a width of the organic layer pattern is within a range of 2 μm~100 μm and a height of the organic layer pattern is within a range of 2 μm~100 μm.

11. The display device of claim 9, wherein the reflector further includes any one of (i) an optical pattern disposed on the first surface of the first light guide member, and (ii) an organic layer pattern comprising the organic material and disposed on the first surface of the first light guide member.

12. The display device of claim 11, wherein a width of the organic layer pattern on the first surface of the first light guide member is within a range of 2 μm~100 μm and a height of the organic layer pattern disposed on the first surface of the first light guide member is within a range of 2 μm~100 μm.

* * * * *